(12) United States Patent
Marlow et al.

(10) Patent No.: US 9,292,884 B2
(45) Date of Patent: Mar. 22, 2016

(54) NETWORK-AWARE PRODUCT ROLLOUT IN ONLINE SOCIAL NETWORKS

(71) Applicant: Facebook, Inc., Menlo Park, CA (US)

(72) Inventors: Cameron Alexander Marlow, Menlo Park, CA (US); Dean Eckles, San Francisco, CA (US); Brian Karrer, San Francisco, CA (US); Johan Ugander, Ithaca, NY (US); Lars Seren Backstrom, Mountain View, CA (US); Jon Kleinberg, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 213 days.

(21) Appl. No.: 13/939,093

(22) Filed: Jul. 10, 2013

(65) Prior Publication Data

US 2015/0019639 A1    Jan. 15, 2015

(51) Int. Cl.
  *G06F 15/16* (2006.01)
  *G06Q 50/00* (2012.01)
  *H04L 29/08* (2006.01)

(52) U.S. Cl.
  CPC ............... *G06Q 50/01* (2013.01); *H04L 67/22* (2013.01)

(58) Field of Classification Search
  USPC .......................................... 345/440; 709/204
  See application file for complete search history.

(56) References Cited

U.S. PATENT DOCUMENTS

| 8,312,056 B1* | 11/2012 | Peng et al. ................. 707/802 |
| 2009/0183084 A1* | 7/2009 | Robertson .............. G06Q 10/06 715/744 |
| 2010/0145771 A1* | 6/2010 | Fligler et al. ................... 705/10 |
| 2010/0153404 A1 | 6/2010 | Ghosh |
| 2011/0225265 A1* | 9/2011 | Dixon .................... G06Q 30/02 709/217 |
| 2012/0071236 A1* | 3/2012 | Ocko ...................... A63F 13/12 463/29 |
| 2013/0066711 A1 | 3/2013 | Liyanage |
| 2013/0124634 A1* | 5/2013 | Weinstein .............. A63F 13/12 709/204 |
| 2013/0159110 A1 | 6/2013 | Rajaram |

OTHER PUBLICATIONS

Allen, K. et al, "A/B Testing," http://en.wikipedia.org/w/index.php?oldid=547499189, 2012.
Aronow, P. et al.,, Estimating average causal effects under general interference, *Working Paper*, http://arxiv.org/abs/1305.6156, May 27, 2013.
Backstrom, L. et al., "Network bucket testing," *WWW 2011*, Apr. 2011.
Bollobás, B., "The Evolution of Random Graphs-the Giant Component," Chapter 6, *Cambridge Univ. Press*, (2nd ed.), pp. 130-159, 2001.
Cellai, D., et al., "Critical phenomena in heterogeneous κ-core percolation," *Phys Rev E*, 87(2):022134 2013.
Fienberg, S., A brief history of statistical models for network analysis and open challenges, *J. Comp. Graph. Stat.*, 21(4), pp. 825-939, Oct. 19, 2012.

(Continued)

*Primary Examiner* — David Lazaro
*Assistant Examiner* — Mahran Abu Roumi
(74) *Attorney, Agent, or Firm* — Baker Botts L.L.P.

(57) ABSTRACT

In one embodiment, a method includes accessing a social graph comprising a plurality of nodes and a plurality of edges connecting the nodes, each node corresponding to a user of an online social network, identifying a plurality of clusters in the social graph using graph clustering, providing a treatment to a first set of users based on the clusters, and determining a treatment effect treatment for the users in the first set based on a network exposure to the treatment for each user.

19 Claims, 6 Drawing Sheets

(56) References Cited

OTHER PUBLICATIONS

Fortunato, S., "Community detection in graphs," *Physics Reports*, 486(3):75-174, 2010.

Gupta, A. et al., "Bounded geometries, fractals, and low-distortion embeddings," *FOCS '03*, 2003.

Horvitz, D. et al., "A generalization of sampling without replacement from a finite universe," *JASA*, 47(260), 663-685, Dec. 1952.

Kao, E. et al., "Causal estimation of peer influence effects," *ICML, Poster*, 2013.

Karger, D. et al, "Finding nearest neighbors in growth-restricted metrics," *STOC '02*, May 2002.

Katzir, L. et al., Framework and algorithms for network bucket testing, *WWW 2012*, Apr. 2012.

Kohavi, R., Trustworthy online controlled experiments: five puzzling outcomes explained, *KDD 12*, Aug. 2012.

Manski, C., Identification of treatment response with social interactions, "*The Econometrics Journal*," 16(1):S1-S23, 2013.

Rubin, D., "Estimating causal effects of treatments in randomized and nonrandomized studies," *J. Ed. Psych.*, 66(5) pp. 688-701, 1974.

Tchetgen, E. et al., "On causal inference in the presence of interference," *Stat. Meth. Med. Res.* 21(1) pp. 55-75, Jan. 16, 2012.

Ugander, J. et al., "Balanced label propagation for partitioning massive graphs," *WSDM '13*, Feb. 2013.

Ugander, J. et al., "Graph Cluster Randomization: Network Exposure to Multiple Universes," 9 pp., available at http://arxiv.org/abs/1305.6979, May 30, 2013.

Ugander, J. et al.," Network exposure to multiple universes," http://bit.ly/nips12-ukbk, 10 pp, Dec. 2012.

Ugander, J. et al.," Network exposure to multiple universes," http://bit.ly/nips12-ukbk2, Poster, 1 p, Dec. 2012.

Watts, Duncan J. et al., "Collective dynamics of 'small-world' networks," *Nature*, 393(6684):440-442, 1998.

Edward Kao, Panos Toulis, Edoardo Airoldi and Donald Rubin—*Causal Estimation of Peer Influence Effects*, Dept. of Statistics, Harvard University, Dec. 7, 2012.

Simon Lunagomez and Edoardo Airoldi—*Bayesian Inference from Non-Ignorable Network Sampling Designs*, Dept. of Statistics, Harvard University, Dec. 7, 2012.

Peter M. Aronow and Cyrus Samii—*Estimating Average Causal Effects Under General Interference*, NYU Devt Economics Workshop, Sep. 22, 2011.

International Search Report and Written Opinion for International Application PCT/US2014/045516, Oct. 27, 2014.

Allen, K. et al, "A/B Testing", 2012.

Aronow, P. et al.,, Estimating average causal effects under general interference, *Working Paper*, May 27, 2013.

\* cited by examiner

NETWORK-AWARE PRODUCT ROLLOUT IN ONLINE SOCIAL NETWORKS

TECHNICAL FIELD

This disclosure generally relates to online social networks and launching features or products in online environments.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A/B testing is a standard approach for evaluating the effects of online experiments. A/B testing typically uses randomized experiments with two variants (typically referred to as A and B), which represent the control and treatment in the experiment. Such experiments are commonly used in web development and marketing, as well as in more traditional forms of advertising. In online settings, the objective is typically to determine how changes to the online environment affect user behavior with the environment. The control and treatment groups are compared, which are generally identical except for a single variation that might impact a user's behavior.

SUMMARY OF PARTICULAR EMBODIMENTS

In particular embodiments, the social-networking system may improve how new products, features, advertisements, or experiences ("treatments") are launched to users of an online social network by staggering the launch to particular user clusters. Rather than using the standard A/B testing approach to test new treatments, the testing and rollout can be done in a network-aware manner. For example, discrete clusters of users may be identified using a suitable clustering algorithm. These user clusters may be defined such that the users in a particular cluster are network exposed with respect to the other users in the same cluster. This may allow the treatment effect to be tested more efficiently because it may ensure that a particular user and most of that user's friends will receive the treatment. This may be particularly advantageous for treatments that are more useful when they can be used with another user (e.g., online chat applications). After user clusters are identified, the treatment may be provided to a first set of user clusters and tested with them. Data received from this first set of user clusters can then be analyzed to determine the treatment effect of the treatment on those users. The treatment may then be modified before being rolled out to the next set of user clusters. This stepwise approach to rolling out the product can be taken until the product is launched to all users.

DESCRIPTION OF EXAMPLE EMBODIMENTS

System Overview

Figure 1:
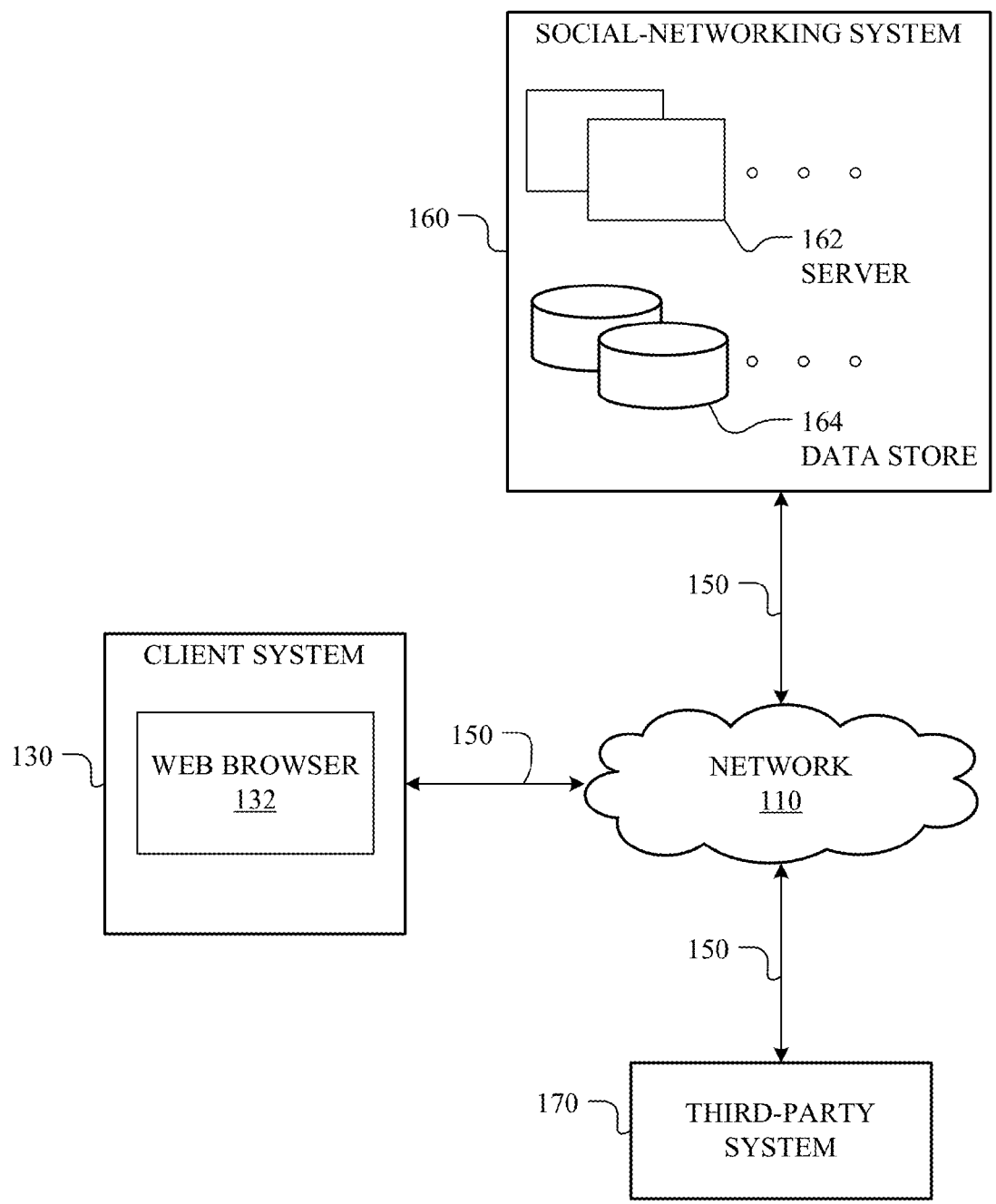
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
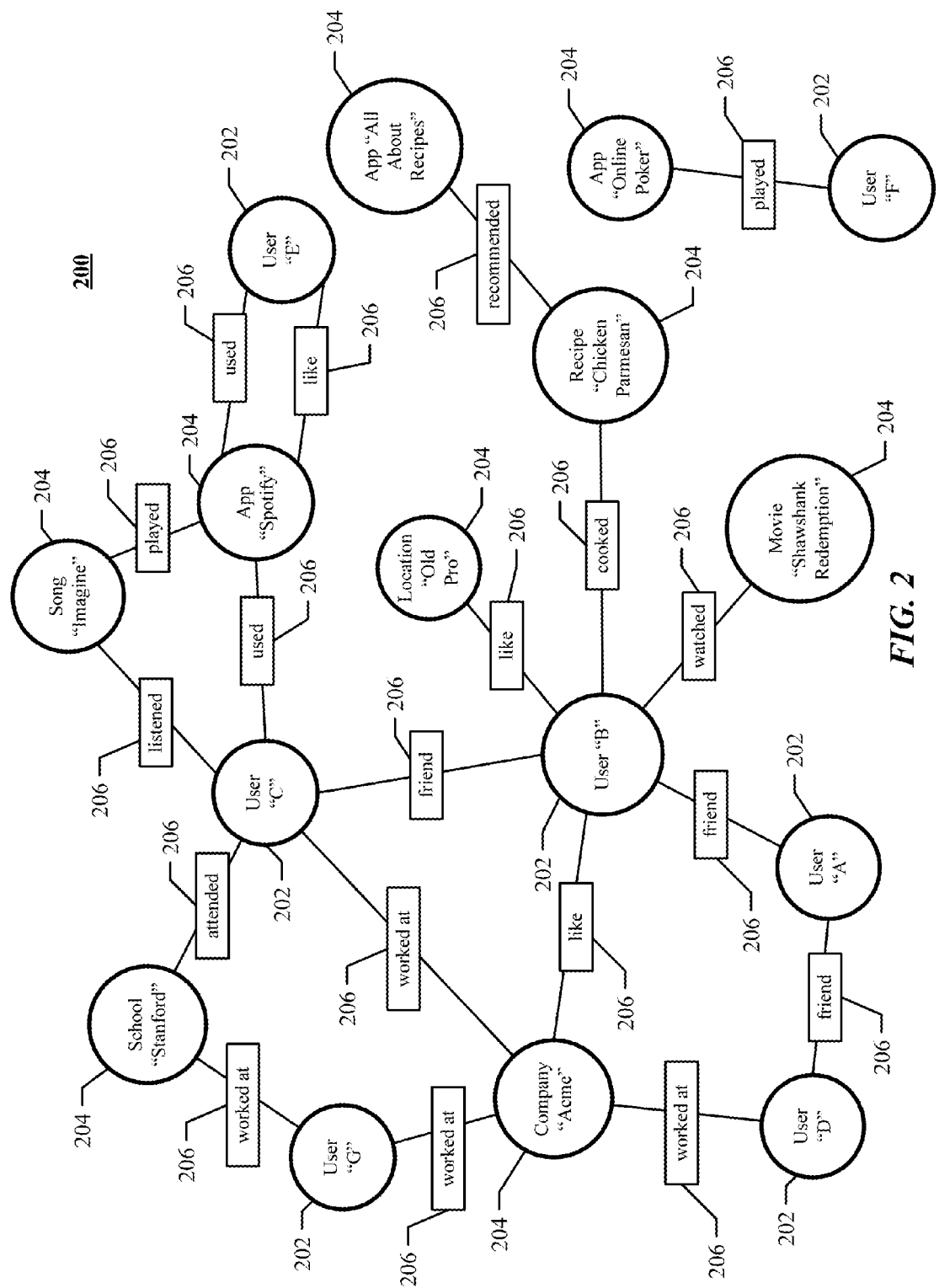
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Network-Aware Product Rollout

In particular embodiments, social-networking system 160 may improve how new products, features, advertisements, or experiences ("treatments") are launched to users of the online social network by staggering the launch to particular user clusters ("clusters"). Rather than using the standard A/B testing approach to test new treatments, the testing and rollout can be done in a network-aware manner. As an example and not by way of limitation, discrete clusters of nodes from social graph 200 may be identified using a suitable clustering algorithm. These clusters may be defined such that the nodes within a particular cluster are network exposed with respect to the other nodes in the same cluster. This may allow the treatment effect of the treatment on those users to be determined more efficiently because it ensures that a particular user and most of that user's friends (corresponding to nodes within a particular cluster) will receive the treatment. This may be particularly advantageous for treatments that are more useful when they can be used with another user (e.g., online chat applications). After clusters are identified, the treatment may be provided to users of a first set of clusters and tested with them. Data received from this first set of clusters can then be analyzed to determine the treatment effect of the treatment on those users. The treatment may then be modified before being rolled out to users in the next set of clusters. This stepwise approach to rolling out the treatment may be taken until the treatment has been provided to all users of the online social network. Although this disclosure describes providing treatments to users and determining treatment effects in a particular manner, this disclosure contemplates providing treatments to user or determining treatment effects in any suitable manner.

A/B testing is a standard approach for evaluating the effect of online experiments. The goal is typically to estimate the average treatment effect of a new product, feature, or condition by exposing a sample of the overall population to it. A drawback with A/B testing is that it is poorly suited for experiments involving social interference, when the treatment of individuals spills over to neighboring individuals along an underlying social network. These drawbacks may be overcome using graph clustering to analyze average treatment effects under social interference. To begin, we characterize graph-theoretic conditions under which individuals may be considered to be 'network exposed' to an experiment. We then show how graph cluster randomization admits an efficient exact algorithm to compute the probabilities for each node being network exposed under several of these exposure conditions. Using these probabilities as inverse weights, an estimator, such as, for example, a Horvitz-Thompson estimator, may then provide an effect estimate that is unbiased, provided that the exposure model has been properly specified.

Given an estimator that is unbiased, we focus on minimizing the variance. First, we develop simple sufficient conditions for the variance of the estimator to be asymptotically small in n, the size of the graph. However, for general randomization schemes, this variance may be lower bounded by an exponential function of the degrees of a graph. In contrast, we show that if a graph satisfies a restricted-growth condition on the growth rate of neighborhoods, then there exists a natural clustering algorithm, based on node neighborhoods, for which the variance of the estimator may be upper bounded by a linear function of the degrees. Thus we show that proper cluster randomization may lead to exponentially lower estimator variance when experimentally measuring average treatment effects under interference.

Social products and services—from fax machines and cell phones to online social networks—inherently exhibit "network effects" with regard to their value to users. The value of these products to a user is inherently non-local, since it typically grows as members of the user's social network use the product as well. Yet randomized experiments (such as A/B tests) critically assume what is known as the "stable unit treatment value assumption" (SUTVA), that each individual's response is affected only by their own treatment and not by the treatment of any other individual. Addressing this tension between the formalism of A/B testing and the non-local effects of network interaction has emerged as a key open question in the analysis of online behavior and the design of network experiments.

Under ordinary randomized trials where the stable unit treatment value assumption is a reasonable approximation (such as, for example, when a search engine A/B tests the effect of their color scheme upon the visitation time of their users) the population is divided into two groups: those in the "treatment" group (who see the new color scheme A) and those in the control group (who see the default color scheme B). Assuming there are negligible interference effects between users, each individual in the treated group responds just as he or she would if the entire population were treated, and each individual in the control group responds just as he or she would if the entire population were in control. In this manner, we may imagine that we are observing results from samples of two distinct "parallel universes" at the same time (for example, "Universe A" in which color scheme A is used for everyone, and "Universe B" in which color scheme B is used for everyone) and we may make inferences about the properties of user behavior in each of these universes.

This tractable structure changes dramatically when the behavior of one user i may have a non-trivial effect on the behavior of another user j—as is the case when the feature or product being tested has any kind of social component. Now, if i is placed in Universe A and j is placed in Universe B, then our analysis of i's behavior in A is contaminated by properties of j's behavior in B, and vice versa; we no longer have two parallel universes.

Average Treatment and Network Exposure.

In particular embodiments, social-networking system 160 may determine a treatment effect of a treatment for the users of a first set of users. One goal is to develop techniques for analyzing the average effect of a treatment on a population when such interaction is present. Social-networking system 160 may test a treatment by providing it to a subset of users of the online social network. The treatment has a "social" component in that i's reaction to the treatment depends on whether a neighbor j in the online social network also has the treatment. This social component may also be referred to as the network effect of the treatment. As an example and not by way of limitation, particular treatments may exhibit social components, such as, for example, social advertisements, text/video chat, messaging, social networking, etc. For example, for text/video chatting features, those features are only useful if user i has one or more neighbors j to chat with. An individual/user is considered to be in the treatment group if the individual is provided with the treatment for the test, and in the control group otherwise. There may be an underlying numerical response variable of interest (for example, the user's time-on-site in each condition), and social-networking system 160 may estimate the average of this response in both the universe where everyone has the service, and the universe where no one has the service, despite the fact that—since the population is divided between treatment and control—neither hypothetical universe is actually being tested. Let $\vec{z} \in \{0,1\}^n$ be the treatment assignment vector, where $z_i=1$ means that user i is in the treatment group and $z_i=0$ means the user i is in the control. Let $Y_1(\vec{z}) \in R$ be the potential outcome of user i under the treatment assignment vector $\vec{z}$. The fundamental quantity we are interested in is the average treatment effect, $\tau$, between the two diametrically opposite universes $\vec{z}=\vec{1}$, and $\vec{z}=\vec{0}$.

$$\tau(\vec{z}=\vec{1}, \vec{z}'=\vec{0}) = \frac{1}{n}\sum_{i=1}^{n}\left[Y_1(\vec{z}=\vec{1}) - Y_i(\vec{z}'=\vec{0})\right]. \quad \text{(eq. 1)}$$

This formulation contains the core problem discussed in informal terms above: unlike ordinary A/B testing, no two users may ever truly be in opposing universes at the same time. In particular embodiments, social-networking system 160 may determine both an individual effect of the treatment for the users and the network effect of the treatment for the users. The treatment effect of a particular treatment may be a function of both the network effect and the individual effect. The non-social component of the treatment may be referred to as the individual effect of the treatment. A treatment has an individual component in that i's reaction to the treatment does not depend on whether a neighbor j in the online social network also has the treatment. As an example and not by way of limitation, a social advertisement to user i may have an individual effect with respect to user i that is independent of whether one or more neighbors j are also exposed to social advertisements (although, of course, social advertisements may also have a network effect). Distinguishing and measuring both the individual and network effects of a particular treatment may be useful for determining how to best modify a treatment in order to increase or improve user engagement with the treatment. Although this disclosure describes determining treatment effects in a particular manner, this disclosure contemplates determining treatment effects in any suitable manner.

Graph Cluster Randomization

Figure 3:
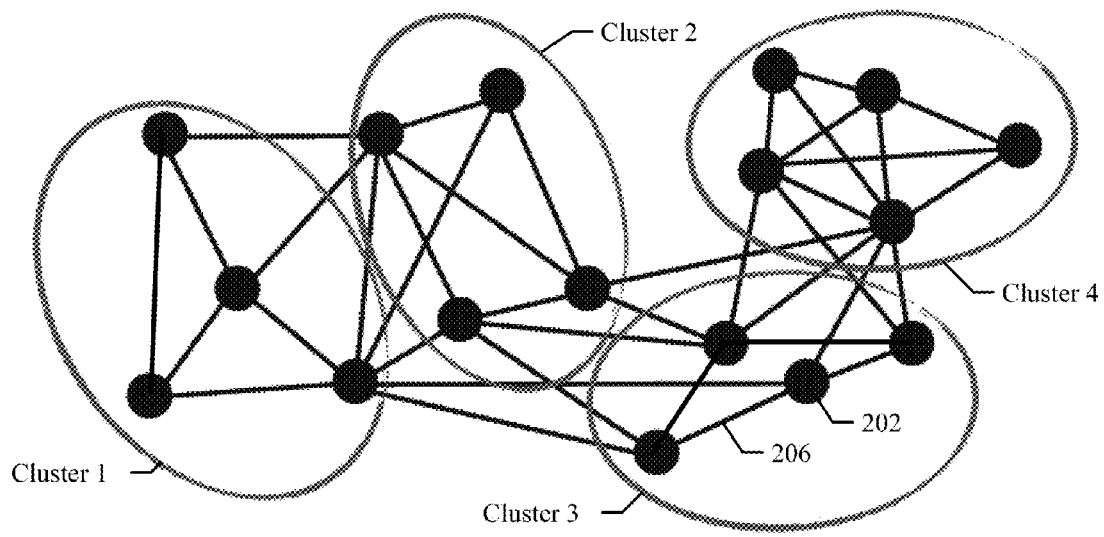
FIG. 3 illustrates an example of clusters in a social graph.

FIG. 3 illustrates an example of clusters in a social graph 200. In particular embodiments, social-networking system may identify a plurality of clusters in social graph 200 using graph cluster randomization. Each identified cluster may comprise a discrete set of nodes from the plurality of nodes of social graph 200. FIG. 3 shows a trivial example of a relatively small social graph 200 with four clusters identified. Each cluster is discrete (i.e., not overlapping). In particular embodiments, social-networking system 160 may specify clusters such that a threshold number of nodes in each cluster may be network exposed with respect to the other nodes in the cluster. A key notion for evaluating (eq. 1) is the notion of network exposure. A user i is "network exposed" to the treatment under a particular assignment $\vec{z}$ if i's response under $\vec{z}=\vec{1}$ is the same as i's response in the assignment, where everyone receives the treatment. (We also discuss adaptations to the case where the responses in these two cases differ only by a small parameter $\in$.) We define network exposure to the control condition analogously. With this definition in place, we may investigate several possible conditions that constitute network exposure. As an example and not by way of limitation, user i may be network exposed to the treatment if i and all of i's neighbors are treated. As another example and not by way of limitation, user i may be network exposed to the treatment if, for a fix fraction q>0, i and at least a q fraction of is neighbors are treated. The definition of network exposure is fundamentally a modeling decision by the experimenter, and in this work we introduce several families of exposure conditions, each specifying the sets of assignment vectors in which a user may be assumed to be network exposed to the treatment and control universes, providing several characterizations of the continuum between the two universes. Choosing network exposure conditions may be important for specifying when social-networking system 160 may observe the potential outcome of a user as if they were in the treatment or control universe, without actually placing all users into the treatment or control universe. In particular embodiments, social-networking system 160 may identify clusters based at least in part on the social-graph affinity of users with respect to each other. Rather than just clustering users based on being neighbors in social graph 200 (i.e., being connected by an edge 206), social-networking system 160 may cluster neighbors having a relatively high social-graph affinity for each other. In other words, user i may be clusters with j neighbors having above a threshold affinity with respect to user i, while neighbors having less affinity for user i may not necessarily be included in the cluster. In particular embodiments, social-networking system 160 may identify clusters such that the network exposure of the nodes in the cluster has a specified distribution range of network exposures. As an example and not by way of limitation, the network exposure may be specified from a threshold level of network exposure (e.g., all nodes in the cluster have greater than or equal to 5% neighborhood exposure) a maximum level of network exposure (e.g., all node in the cluster have less than or equal to 95% neighborhood exposure). Social-networking system 160 may then determine the treatment effect of the treatment on the users in a cluster over the distribution range of network exposures. These treatment effects may then be extrapolated to their limits to determine the individual and network effects of the treatment. Although this disclosure describes identifying clusters with network exposure in a particular manner, this disclosure contemplates identifying clusters with network exposure in any suitable manner.

Following the formulation of network exposure, a second key notion that we introduce is a generic graph randomization scheme based on graph clustering, which we refer to as graph cluster randomization. Graph cluster randomization is a technique in which the graph is partitioned into a set of clusters and then randomization between treatment and control is performed at the cluster level. The probability that a node is network exposed to treatment or control will then typically involve a graph-theoretic question about the intersection of the set of clusters with the local graph structure near the node. Social-networking system 160 may precisely determine the non-uniform probabilities of entering network exposure conditions under such randomization. Using inverse probability weighting [ref 9], social-networking system 160 may then derive an unbiased estimator of the average treatment effect $\tau$ under any network exposure for which we may explicitly compute probabilities.

We motivate the power of graph cluster randomization by furnishing conditions under which graph cluster randomization will produce an estimator with asymptotically small variance. First, we observe that if the graph has bounded degree and the sizes of all the clusters remain bounded independent of the number of nodes n, then the estimator variance is $O(1/n)$, a simple but illustrative sufficient condition for smallness. The key challenge is the dependence on the degrees—in general, a collection of bounded-size clusters may produce a variance that grows exponentially in the node degrees. More precisely, when performing graph cluster randomization with single-node clusters, the variance of the estimator admits a lower bound that depends exponentially on the degrees. This raises the important algorithmic question of how to choose the clustering: bounded-size clusters provide asymptotically small variance in the number of nodes n, but if the clusters are not chosen carefully then we get an exponential dependence on the node degrees which could cause the variance to be very large in practice.

Cluster Randomization in Restricted-Growth Graphs.

We identify an important class of graphs, which we call restricted-growth graphs, on which a non-trivial clustering algorithm admits an upper bound on the estimator variance that is linear in the degrees of the graph. The restricted-growth condition that we introduce for graphs is an expansion of the bounded-growth condition previously introduced for studying nearest-neighbor algorithms in metric spaces [ref 10], designed to include low-diameter graphs in which neighborhoods may grow exponentially. Let $B_r(v)$ be the set of nodes within $\tau$ hops of a node v; our restricted-growth condition says that there exists a constant $\kappa$, independent of the degrees of the graph, such that for all nodes v and all $\tau>0$, we have $|B_{r+1}(v)| \leq \kappa |B_r(v)|$. Note the comparison to the standard bounded-growth definition, which requires $|B_{2r}(v)| \leq \kappa |B_r(v)|$, a much stronger condition and not necessary for our results to hold.

For restricted-growth graphs, we provide a clustering algorithm for which the estimator variance may grow only linearly in the degree. The challenge is that the variance may grow exponentially with the number of clusters that intersect a node's neighborhood; our approach is to form clusters from balls of fixed radius grown around a set of well-separated nodes. The restricted growth condition prevents balls from packing too closely around any one node, thus preventing node neighborhoods from meeting too many clusters. For the special case of restricted-growth graphs that come with a uniform-density embedding in Euclidean space, one may use the locations of nodes in the embedding to carve up the space into clusters directly; the point, as in work on the nearest-neighbor problem [ref 10], is to control this carving-up at a graph-theoretic level rather than a geometric one, and this is what our technique does.

Our class of restricted-growth graphs provides an attractive model for certain types of real-world graphs. Restricted-growth graphs include graphs for which there exists an embedding of the nodes with approximately uniform density in a Euclidean space of bounded dimension, such as lattices or random geometric graphs, where edges connect neighbors within some maximal metric distance.

Network Exposure Models

For A/B randomized experiments, the treatment condition of an individual decides whether or not they are subject to an intervention. This typically takes two values: 'treatment' or 'control'. In most randomized experiments, the experimenter has explicit control over how to randomize the treatment conditions, and generally individuals are assigned independently. Meanwhile, the exposure condition of an individual determines how they experience the intervention in full conjunction with how the world experiences the intervention. Without the stable unit treatment value assumption, at worst each of the $2^n$ possible values of $\vec{z}$ define a distinct exposure condition for each user. Aronow and Samii call this "arbitrary exposure" [ref 2], and there would be no tractable way to analyze experiments under arbitrary exposure.

Consider the potential outcomes for user i. In the "arbitrary exposure" case, $Y_i(\vec{z})$ is completely different for every possible $\vec{z}$. This means that we will never be able to observe $Y_i(\vec{z})$ for either $\vec{z}=\vec{1}$ or $\vec{z}=\vec{0}$ without putting all users into the treatment or control universes. Thus, to make progress on estimating the average treatment effect under any other conditions, we require further assumptions. We do this here by assuming that multiple treatment vectors $\vec{z}$ may map to the same potential outcomes: essentially, as long as treatment vectors $\vec{z}=\vec{1}$ and $\vec{z}=\vec{0}$ are "similar enough" from the perspective of a node i, in a sense to be made precise below, then i will have the same response under $\vec{z}=\vec{1}$ and $\vec{z}=\vec{0}$.

Specifically, let $\sigma_i^k$ be the set of all assignment vectors $\vec{z}$ for which i experiences outcome $\chi$. We refer to $\sigma_i^k$ as an exposure condition for i; essentially, $\sigma_i^k$ consists of a set of assignment vectors that are "indistinguishable" from i's point of view, in that their effects on i are the same. Our interest is in the particular exposure conditions $\sigma_i^1$ and $\sigma_i^0$, which we define to be the sets that contain $\vec{z}=\vec{1}$ and $\vec{z}=\vec{0}$ respectively. In this way, we are assuming that for all $\vec{z}_1 \in \sigma_i^1$, we have $Y_i(\vec{z}=\vec{z}_1)=Y_i(\vec{z}=\vec{1})$, and for all $\vec{z}_0 \in \sigma_i^0$, we have $Y_i(\vec{z}=\vec{z}_0)=Y_i(\vec{z}=\vec{0})$. Note that it is possible that $\vec{z}=\vec{1}$ and $\vec{z}=\vec{0}$ belong to the same exposure condition and that $\sigma_i^1=\sigma_i^0$, which corresponds to a treatment that has no effects. (If this strikes the reader as too restrictive a definition of "exposure condition", consider instead partitioning the space of potential outcomes (rather that partitioning the space of assignment vectors) using small $\in$-sized bins, and define the "exposure conditions" as all assignment vectors that produce a potential outcome in that $\in$-bin. In cases where no other potential outcomes correspond to the outcomes for $\vec{z}=\vec{0}$, or $\vec{z}=\vec{1}$ it may be more appropriate to manage bias using c distances on potential outcomes this way.)

We define an exposure model for user i as a set of exposure conditions that completely partition the possible assignment vectors $\vec{z}$. The set of all models, across all users, is the exposure model for an experiment. For our purposes though, it is unnecessary to entirely specify an exposure model, since we are only trying to determine the average treatment effect between the extreme universes. We primarily care about the exposure conditions $\sigma_i^1$ and $\sigma_i^0$ for which each user i experiences exposure to the treatment or control universe. (If one was to assume functional relationships between the potential outcomes in different exposure conditions then other exposure conditions besides $\sigma_i^1$ and $\sigma_i^0$ could become more relevant.)

Of course, the true exposure conditions $\sigma_i^1$ and $\sigma_i^0$ for each user are not known to the experimenter a priori, and analyzing the results of an experiment requires choosing such conditions in our framework. If poor exposure conditions are chosen by the experimenter, users may respond in ways that do not correspond to $\vec{z}=\vec{1}$ and $\vec{z}=\vec{0}$ and bias may be introduced into the calculation of the average treatment effect. The magnitude of this bias depends on how close the outcomes actually observed are to the outcomes at $\vec{z}=\vec{1}$ and $\vec{z}=\vec{0}$ that we wanted to observe. It may even be favorable to allow such bias in order to lower variance in the results of the experiment.

Neighborhood Exposure

In particular embodiments, social-networking system 160 may identify clusters such that they are exposed to a variety of exposure conditions. Any suitable exposure condition may be used. In particular, we focus primarily on local exposure conditions, where two assignments are indistinguishable to i if they agree in the immediate graph neighborhood of i. We consider absolute and fractional conditions on the number of treated neighbors. Note we are not necessarily asserting that these possible exposure conditions are the actual exposure conditions with respect to the actual potential outcomes in an experiment, but rather that they provide useful abstractions for the analysis of an experiment, where again the degree of bias introduced depends on how well the exposure conditions approximate belonging to the counterfactual universes. As an example and not by way of limitation, social-networking system 160 may define clusters such that, for each clusters, the network exposure of the nodes in the cluster is full neighborhood exposure. In full neighborhood exposure, node i experiences full neighborhood exposure to a treatment condition if i and all i's neighbors receive that treatment condition. As another example and not by way of limitation, social-networking system 160 may define clusters such that, for each clusters, the network exposure of the nodes in the cluster is absolute k-neighborhood exposure. In absolute k-neighborhood exposure, node i of degree d, where d≥k, experiences absolute k-neighborhood exposure to a treatment condition if i and ≥k neighbors of i receive that treatment condition. As yet another example and not by way of limitation, social-networking system 160 may define clusters such that, for each clusters, the network exposure of the nodes in the cluster is fractional q-neighborhood exposure. In fractional q-neighborhood exposure node i of degree d experiences fractional q-neighborhood exposure to a treatment condition if i and ≥qd neighbors of i receive that treatment condition. The k-absolute and q-fractional neighborhood exposures may be considered relaxations of the full neighborhood exposure for node i in that they require fewer neighbors of i to have a fixed treatment condition for i to be considered as belonging to that exposure condition. In fact, the set of assignment vectors that correspond to k-absolute and q-fractional neighborhood exposures are each nested under the parameters k and q respectively. Increasing k or q decreases the set of assignment vectors until reaching full neighborhood exposure for node i. Although this disclosure describes particular exposure conditions, this disclosure contemplates any suitable exposure conditions.

It is natural to consider heterogeneous values k or q—values that differ for each user—but we limit our discussion to exposure conditions that are homogeneous across users as much as possible. We may incorporate a mild heterogeneity in the definition of k-neighborhood exposure when nodes have degree d>k; for these nodes we consider full neighborhood exposure instead. Fractional exposure does not require this adjustment.

Core Exposure

Full neighborhood exposure is clearly only an approximation of full immersion in a universe. Beyond local exposure conditions, we also consider exposure condition with global dependence. As one approach, consider individuals as exposed to a treatment only if they are sufficiently surrounded by sufficiently many treated neighbors who are in turn also surrounded by sufficiently many treated neighbors, and so on. This recursive definition may initially appear intractable, but such recursive exposure may in fact be characterized precisely by analyzing the k-core—and more generally the heterogeneous k-core—on the induced graph of treatment and control individuals. The k-core of a graph G=(V,E) is the maximal subgraph of G in which all nodes have degree at least k [ref 4]. Similarly, the heterogeneous k-core of a graph G=(V,E), parameterized by a vector $\vec{k}=(k_1, \ldots, k_{|V|})$, is the maximal subgraph H=(V',E') of G in which each node $v_i \in V'$ has degree at least $k_i$ [ref 5]. Similarly, the fractional q-core is the maximal subgraph H=(V',E') of G=(V,E) in which each node $v_i \in V'$ is connected to at least a fraction q of the nodes it was connected to in G. Thus, for all $v_i \in V'$, $\deg_H(v_1) \geq q \deg_G(v_1)$. Equivalently, if $d_i$ is the degrees of node i, the fractional q-core is the heterogeneous k-core of G for $\vec{k}=(qd_1, \ldots, qd_{|V|})$.

Since the heterogeneous k-core is a well-defined object, so is the fractional q-core. Using this definition, we now define exposure conditions that are all stricter versions of corresponding earlier neighborhood conditions. As an example and not by way of limitation, social-networking system 160 may define clusters such that, for each clusters, the network exposure of the nodes in the cluster is component exposure. In component exposure node i experiences component exposure to a treatment condition if i and all of the nodes in its connected component receive that treatment condition. As another example and not by way of limitation, social-networking system 160 may define clusters such that, for each clusters, the network exposure of the nodes in the cluster is absolute k-core exposure. In absolute k-core exposure node i with degree d≥k experiences absolute k-core exposure to a treatment condition if i belongs to the k-core of the graph G[V'], the subgraph of G induced on the nodes $V^i$ that receive that treatment condition. As another example and not by way of limitation, social-networking system 160 may define clusters such that, for each clusters, the network exposure of the nodes in the cluster is fractional q-core exposure. In fractional q-core exposure node i experiences fractional q-core exposure to a treatment condition if i belongs to the fractional q-core of the graph G[V'], the subgraph of G induced on the nodes V' that receive that treatment condition. Component exposure is perhaps the strongest requirement for network exposure imaginable, and it is only feasible if the interference graph being studied is comprised of many disconnected components. We include it here specifically to note that the fractional q-core exposure for q=1 reduces to component exposure. Again like the neighborhood exposure case, absolute core exposure requires heterogeneity in k across users for it to be a useful condition for all users. A parsimonious solution analogous to the solution for k-neighborhood exposure may be to consider heterogeneous max(degree, k)-core exposure. Fractional q-core exposure, like fractional q-neighborhood exposure, is again free from these parsimony problems.

Core exposure conditions are strictly stronger than the associated neighborhood exposure conditions above. In fact, every assignment vector in which a node i would be component or core exposed corresponds to neighborhood exposure, but not vice versa. So the assignment vectors of core and component exposure are entirely contained in those of the associated neighborhood exposure.

Other Exposure Conditions.

Other exposure conditions may prove relevant to particular applications. In particular, we draw attention to the intermediate concept of placing absolute or fractional conditions on the population of nodes within h hops, where h=1 is the neighborhood exposure conditions above. As an example and not by way of limitation, social-networking system 160 may define clusters such that, for each clusters, the network exposure of the nodes in the cluster is such that a threshold fraction of nodes within a threshold degree of separation of i are exposed to the treatment. We also note that on social networks with very high degree, for many applications it may be more relevant to define the exposure conditions in terms of a lower degree network that considers only stronger ties.

Randomization and Estimation

In particular embodiments, social-networking system 160 may provide a treatment to a first set of users corresponding to a first set of clusters. The treatment may be, for example, a particular advertisement, product, feature, experience, other suitable treatment, or any combination thereof. The treatment may be provided via the online social network or via a third-party system 170. Social-networking system 160 may then determine a treatment effect of the treatment on the users of the first set of users. Using the concept of network exposure, we may now consider estimating the average treatment effect τ between the two counterfactual universes using a randomized experiment. Recall that $\vec{z}$ is the treatment assignment vector of an experiment. To randomize the experiment, let $\vec{z}$ be drawn from Z, a random vector that takes values on $\{0, 1\}^n$, the range of $\vec{z}$. The distribution of Z over $\{0, 1\}^n$ given by $Pr(Z=\vec{z})$ is what defines our randomization scheme, and it is also exactly what determines the relevant probabilities of network exposure.

For a user i, $Pr(Z \in \sigma_1^i)$ is the probability of network exposure to treatment and $Pr(Z \in \sigma_0^i)$ is the probability of network exposure to control. In general, these probabilities will be different for each user and each treatment condition, and knowing these probabilities makes it possible to correct for allocation bias during randomization. In particular, it becomes possible to use the Horvitz-Thompson estimator, $\hat{\tau}$, to obtain an unbiased estimate of τ, here given by:

$$\hat{\tau}(Z) = \frac{1}{n} \sum_{i=1}^{n} \left( \frac{Y_i(Z)1[Z \in \sigma_0^i]}{Pr(Z \in \sigma_0^i)} - \frac{Y_i(Z)1[Z \in \sigma_1^i]}{Pr(Z \in \sigma_1^i)} \right), \quad \text{(eq. 2)}$$

where 1[x] is the indicator function. Assuming the probabilities are positive, the expectation over Z gives τ, though note that this does assume that the exposure conditions are not misspecified. In particular embodiments, social-networking system 160 may provide the treatment to a second set of users corresponding to a second set of clusters. The processed described herein may then be repeated as necessary until the treatment has been provided to all users of the online social network. In this way, a advertisement, feature, or product may be rolled-out out to users of the online social network in a network-aware manner such that each cluster of users receiving the treatment experiences the treatment such that the user in a treatment group feels as if the treatment has effectively been provided to the entire social network when in fact it has really only been provided to a particular set of users. In particular embodiments, after the treatment effect has been determined for the first set of users, social-networking system 160 may modify the treatment based on the determined treatment effect of the treatment on the users of the first set of users. The advertisement, feature, or product may be modified based on the determined treatment effect to, for example, optimize a user's interactions or experience with the treatment. The modified treatment may then be provided to an additional set of users, and successively modified and rolled-out to additional users until, for example, it has been sufficiently improved and can be launched to the entire online social network. Although this disclosure describes providing a treatment and determining treatment effects in a particular manner, this disclosure contemplates providing a treatment or determining treatment effects in any suitable manner. Furthermore, although this disclosure describes using particular estimators, this disclosure contemplates using any suitable estimators.

As an example and not by way of limitation, let us examine the exposure probabilities for the simplest network exposure condition, full neighborhood exposure, and under the simplest randomization scheme—independent node randomization, in which each node is independently assigned to treatment or control. If all nodes are treated independently with probability p∈(0,1) then the probability of full neighborhood exposure to treatment for a user i of degree $d_i$ is simply given by $Pr(Z \in \sigma_1^i) = p^{d_i+1}$, and the probability of full neighborhood exposure to control is given by $Pr(Z \in \sigma_0^i) = (1-p)^{d_i+1}$. This highlights the main challenge of network exposure: the chance that a node with high degree manages to reach full neighborhood exposure, or anywhere near it, may be exponentially small in $d_i$. Intuitively, such small exposure probabilities will dramatically increase the variance of the Horvitz-Thompson estimator, and it indicates the necessity of using more intelligent randomization.

To reduce the variance of this Horvitz-Thompson estimator, we introduce a general graph cluster randomization approach, creating graph clusters and randomizing assignment at the cluster level rather than at the node level, with clusters assigned independently. Connected nodes will then be assigned to the same treatment condition more often than would happen with independent assignment, increasing the expected number of users who are network exposed to a condition at the cost of increased correlations between users' exposure conditions.

Let the nodes be partitioned into $n_c$ clusters $C_1, \ldots, C_{n_c}$. Let $N_i \subseteq V$ denote the neighbors of i in the graph G, and let $S_i = \{C_j : (i \cup N_i) \cap C_j \neq 0\}$ denote the set of clusters that contain i or a neighbor of i; we call $S_i$ the set of clusters to which i is connected. Using this notation, we will now examine the probabilities of different network exposures.

Exposure Probabilities

As an example and not by way of limitation, for the full neighborhood exposure condition, the probability of network exposure to treatment simply becomes $\Pr(Z \in \sigma^0) = p^{|S_i|}$ and to control becomes $\Pr(Z \in \sigma_i^1) = (1-p)^{|S_i|}$. We now show that computing the exposure probabilities for absolute and fractional neighborhood exposure conditions is tractable as well.

Consider the challenge of computing the probability that node i with degree $d_i$ is treated and more than k of its neighboring nodes are treated under cluster randomization. This applies when considering both absolute and fractional neighborhood exposures. First, let us reindex the clusters such that if i is connected to $|S_1| = s$ clusters, i itself resides on cluster s, and we let $j = 1, \ldots, s-1$ denote the other connected clusters. Let $w_{i1}, \ldots, w_{is}$ be the number of connections i has to each cluster, and let the Bernoulli(p) random variables $X_1, \ldots, X_S$ denote the independent coin tosses associated with each cluster. Then:

$$\Pr[Z \in \sigma^1] = \Pr[X_s = 1] \cdot \Pr[\Sigma_{j=1}^{s-1} w_{ij} X_j \geq k - w_{is}],$$

$$\Pr[Z \in \sigma_i^0] = \Pr[X_s = 0] \cdot \Pr[\Sigma_{j=1}^{s-1} w_{ij} X_j \leq d_i - k].$$

Here the random quantity $\Sigma_j w_{ij} X_j$ obeys a weighted equivalent of a Poisson-binomial distribution, and the probabilities in question may be computed explicitly using a dynamic program defined by the following recursion $$\Pr[\Sigma_{j=1}^s w_j X_j \geq T] = p\Pr[\Sigma_{j=1}^{s-1} w_{ij} X_j \geq T - w_{is}] + (1-p)\Pr[\Sigma_{j+1}^{s-1} w_{ij} X_j \geq T].$$

Note that T is bounded by the maximum node degree $d_{max}$, making this a polynomial time dynamic program with runtime $O(d_{max} s)$.

The probability that node i is treated and $\geq k$ neighboring nodes are treated under independent cluster randomization is given by:

$$\Pr\lfloor Z \in \sigma_i^1 \rfloor = pf(s-1, k-w_{is}, p, \vec{w}),$$

where:

$$f(1, T; p, \vec{w}_i) = p1[T < w_{i1}],$$

$$f(j, T; p, \vec{w}_i) = pf(j-1, T-w_{ij}; p, \vec{w}_i) + (1-p)f(j-1, T; p, \vec{w}_i).$$

The probability that node i is in control and $\geq k$ neighboring nodes are in control under independent cluster randomization is given by:

$$\Pr\lfloor Z \in \sigma_i^1 \rfloor = (1-p)[1-f](s-1 \cdot d_i - k+1; p, \vec{w}).$$

Recall that these partial neighborhood exposure conditions (absolute and fractional) are nested. In fact, for a given node i the recursion may be used to derive the probability for every possible threshold value under consideration in a single $O(d_{max} s)$ double for-loop. Such a computation in fact returns the probability distribution over the exposure space for each individual.

Figure 4:
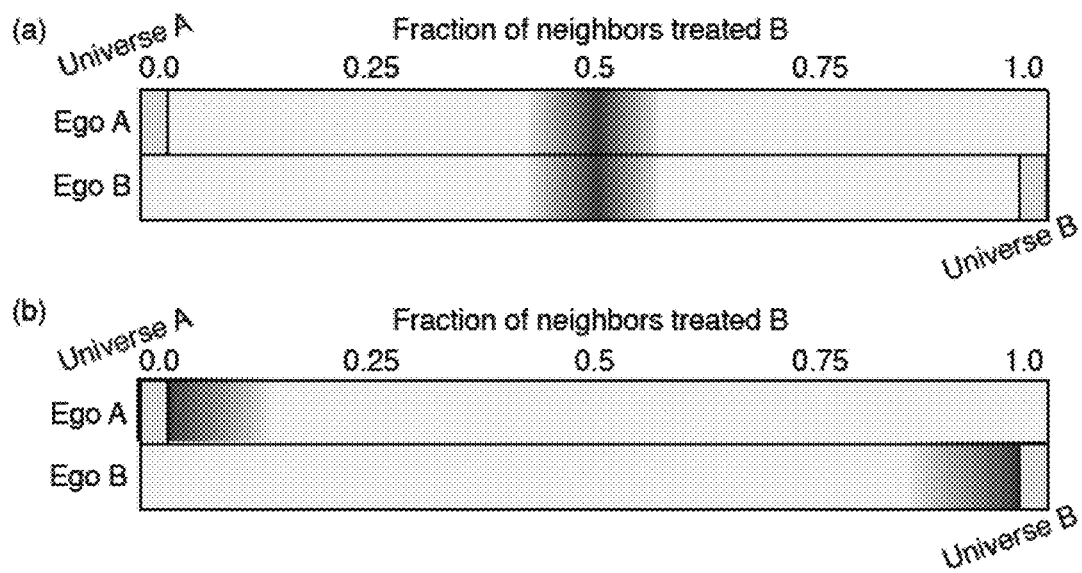
FIG. 4 illustrates example probability distributions.

FIG. 4 illustrates example probability distributions. The probability distribution over the exposure space for a single individual, where the exposure conditions $\sigma_i^0$ and $\sigma_i^1$ are shown in yellow for both (a) an i.i.d. node randomization and (b) an ideal cluster randomization, where the probability mass is collected at exposure conditions of interest. Although FIG. 4 illustrates and this disclosure describes particular probability distributions, this disclosure contemplates any suitable probability distributions.

The dynamic program above only provides a means of exactly computing exposure probabilities for absolute and fractional neighborhood exposure conditions. Unfortunately, how to efficiently compute the exact probability of k-core and fractional q-core exposure conditions is unclear, but recall that these exposure conditions were formally nested subsets of the corresponding neighborhood exposure conditions. This at least allows us to upper bound the core exposure probabilities, and we formalize this connection via the following proposition. Because we are generally concerned about exposure probabilities being too small, this upper bound may be useful in identifying nodes with problematically small probabilities already under neighborhood exposure.

The probability node i is network exposed to a treatment condition under core exposure is less than or equal to the probability under the analogous neighborhood exposure:

$$\Pr(Z \in \sigma_i^x | k\text{-core}) \leq \Pr(Z \in \sigma_i^x | k\text{-}n\text{hood}),$$

$$\Pr(Z \in \sigma_i^x | \text{frac} q\text{-core}) \leq \Pr(Z \in \sigma_i^x | \text{frac} q\text{-}n\text{hood}),$$

It is possible that a useful direct estimate of the core exposure probabilities may be obtained via Monte Carlo sampling of the randomization, but we do not explore that possibility here.

Estimator Variance

The variance of the Horvitz-Thompson estimator under interference has been studied by Aronow and Samii [ref 2], where they also present several variance reduction schemes. Estimating the variance under their approach requires knowledge of joint exposure conditions, the joint probability that node i is network exposed to treatment/control and node j is network exposed to treatment/control. This is the probability that the random vector Z is in the exposure condition for node i and for node j simultaneously, i.e. $\Pr(Z \in (\sigma_i^1 \cap \sigma_j^1))$ for joint network exposure to treatment. If one is interested in computing the variance of the estimator analytically then there is nothing fundamentally different about this probability computation when compared to the single node exposure probability, aside from the fact that the intersection of the two sets may be empty.

The variance of the effect estimator where $$\hat{Y}^x(Z) = \frac{1}{n}\sum_i [Y_i(Z)1[Z \in \sigma_i^x]/Pr(Z \in \sigma_i^x)],$$

is given by:

$$\text{Var}[\vec{\tau}(Z)] = [\text{Var}[\vec{Y}^1(Z)] + \text{Var}[\vec{Y}^0(Z)] - 2\text{Cov}[\vec{Y}^1(Z), \hat{Y}^0(Z)]] \quad \text{(eq. 3)}.$$

Assuming the exposure conditions are properly specified, namely assuming that $Y_i(\vec{z})$ is constant for all $\vec{z} \in \sigma_i^x$, we may introduce the notation $Y_i(\sigma_i^x) := Y_i(\vec{z} \in \sigma_i^x)$. Using the further notation $\pi_i^x := Pr[Z \in \sigma_i^x]$ and $\pi_{ij}^{xy} := Pr[Z \in (_i^x \cup \sigma_j^y)]$ we obtain $$\text{Var}[\hat{Y}^x(Z)] = \quad \text{(eq. 4)}$$
$$\frac{1}{n^2}\left[\sum_{i=1}^n \frac{1-\pi_i^x}{\pi_i^x} Y_i(\sigma_i^x)^2 + \sum_{i=1}^n \sum_{\substack{j=1 \\ j \neq 1}}^n \frac{\pi_{ij}^{xx} - \pi_i^x \pi_j^x}{\pi_i^x \pi_j^x} Y_i(\sigma_i^x) Y_j(\sigma_j^x)\right],$$

and $$\text{Cov}[\hat{Y}^1(Z), \hat{Y}^0(Z)] = \quad \text{(eq. 5)}$$
$$\frac{1}{n^2}\left[\sum_{i=1}^n \sum_{\substack{j=1 \\ j \neq i}}^n \frac{\pi_{ij}^{10} - \pi_i^1 \pi_j^0}{\pi_i^1 \pi_j^0} Y_i(\sigma_i^1) Y_j(\sigma_j^0) - \sum_{i=1}^n Y_i(\sigma_i^1) Y_i(_i^0)\right],$$

The above expressions make it evident that the variance is very tightly controlled by the probabilities of exposure, and in order to upper bound the variance we will require lower bounds on the probabilities $\pi_i^x$ and also upper bounds on the joint probabilities $\pi_{ij}^{xy}$ for all node pairs and all combinations of x and y. For neighborhood exposure, we may now write basic sufficient conditions under which the variance of the estimator is asymptotically O(1/n) in n for graph cluster randomization.

Assume the potential outcomes $Y_i(\cdot)$ are all O(1) in n. If G has maximum degree O(1) and the size of each cluster is O(1), then the variance of the Horvitz-Thompson estimator for full, k-neighborhood, and q-fractional neighborhood exposure under graph cluster randomization is O(1/n). Assume G has maximum degree O(1) and the size of each cluster is O(1). All of the single sums are clearly O(n):$\pi_i^x$ is O(1) since all nodes have bounded degree. For the double sums, note that $\pi_{ij}^{xx} = \pi_i^x \pi_j^x$ if and only if i and j have no common cluster neighbors, $|S_i \cap S_j| = 0$. Whenever $|S_i \cap S_j| > 0, \pi_{ij}^{xx} > \pi_i^x \pi_j^x$ for full, k-neighborhood, and q-fractional neighborhood exposure. Further, $\pi_{ij}^{10} < \pi_i^1 \pi_j^0$ if $|S_i \cap S_j| > 0$ and $\pi_{ij}^{10} = \pi_i^1 \pi_j^0$ otherwise. So the terms of the double sums are zero whenever $\pi_{ij} = \pi_i \pi_j$ and when the terms are not zero ($|S_i \cap S_j| > 0$), they are all positive and bounded above O(1) due to the bounded degrees. We now bound the number of nodes j for which ($|S_i \cap S_j| > 0$). Node i at most connects to O(1) clusters and therefore $|S_i| = O(1)$. For all $C \in S_i$, we have that ($|S_i \cap S_j| > 0$) for any $j \in C$ and for any node j that is adjacent to a node in cluster C. Both of these contributions are O(1), giving an O(1) contribution of nodes for each $C \in S_i$. Since there are O(1) such clusters, this is still O(1) nodes j in total for node i such that ($|S_i \cap S_j| > 0$). Thus for each node, at most O(1) of the terms in the double sum are positive, making the total variance O(1/n).

Variance on Restricted-Growth Graphs

In particular embodiments, social-networking system 160 may measure average treatment effects under interference on large-scale graphs using a randomization scheme capable of containing the estimator variance for high-degree nodes. Any graph satisfying restricted-growth conditions admits a clustering that may produce an unbiased effect estimate that is both O(1/n) and linear in the degrees of the graph. In contrast, with less careful clustering, it is easy for the variance to grow exponentially in the degrees. Let us first define restricted-growth graphs. Let $B_r(v)$ be the set of nodes within r hops of a node v. A G=(V,E) is a restricted-growth graph if for all nodes $v \in V$ and all $r > 0$, we have $|B_{r+1}(v)| \leq k|B_r(v)|$. As mentioned in the introduction, graphs derived from a uniform density embedding in a Euclidean space of dimension m exhibit restricted growth, with growth constant $k+2^m$ independent of degree. To develop intuition for the restricted-growth assumption, we first analyze the variance using graph cluster randomization on a family of particularly tractable restricted-growth graphs, kth powers of the cycle. We follow this analysis by proving bounds on the variance for general restricted-growth graphs. Although this disclosure describes measuring treatment effects in a particular manner, this disclosure contemplates measuring treatment effects in any suitable manner.

Cycle and Powers of the Cycle Examples

As an example and not by way of limitation, first we will consider a simple graph consisting of a single cycle with n nodes. For this graph, we consider the full neighborhood exposure model, where we are interested in the average treatment effect between $\sigma_i^1$, when a node is treated and both of their neighbors are treated, and $\sigma_i^1$, when a node is not treated and neither of their neighbors are treated. For the fixed responses of the nodes to treatment and control, we assume that all nodes uniformly respond $Y_i(\sigma_i^1) = \overline{Y}$ to network exposure to the treatment and $Y_i(\sigma_i^0) = 0$ to network exposure to the control. The cycle graph clearly admits an intuitively obvious clustering using the cycle structure, with contiguous blocks of c nodes randomized together. As a last assumption, assume that clusters are selected under a balanced randomization with p=½. Our goal is to determine how the variance of the Horvitz-Thompson average treatment effect estimator depends on the size c of these clusters. For this basic combination of graph, exposure condition, responses, and clustering, one may derive the asymptotic variance exactly.

Consider the variance presented in (eq. 3) above. Since all nodes respond zero to the control condition in our example, as long as the exposure probability for the control condition is strictly positive then both $\text{Var}(\hat{Y}(\sigma_0))$ and $\text{Cov}(\hat{Y}(\sigma_1), \hat{Y}(\sigma_0))$ are zero. Since our calculations will rely only on probabilities $\pi_i^1$ for the exposure to treatment condition, we omit the superscript. The variance is then:

$$\text{Var}[\hat{r}(Z)] = \frac{\overline{Y}^2}{n^2}\left[\sum_{i=1}^n \left(\frac{1}{\pi_i} - 1\right) + \sum_{i=1}^n \sum_{\substack{j=1 \\ j \neq i}}^n \left(\frac{\pi_{ij}}{\pi_i \pi_j} - 1\right)\right], \quad \text{(eq. 6)}$$

Notice that the terms of the double sum are only non-zero for node pairs where $\pi_{ij} \neq \pi_i \pi_j$.

First, consider the case of each node being its own cluster. The probability of being exposed and both of one's neighbors being exposed is equal to the probability of seeing three independent coins come up heads. When the randomization is balanced (e.g., $p=\frac{1}{2}$), we obtain $\pi_i = \frac{1}{8}, \forall i$. Note that the co-assignment probabilities depend on whether nodes i and j are neighbors or share a neighbor. From this we derive $\pi_{ij} = \frac{1}{16}$ if $|i-j|=1$ and $\pi_{ij} = \frac{1}{32}$ if $|i-j|=2$, and if $|i-j|>2$, the probabilities are independent. We obtain $$\text{Var}(\hat{\tau}(Z)) = (15/2)\bar{Y}^2 \frac{1}{n} + O(1/n^2).$$

Now, consider randomizing blocks of $c \geq 2$ nodes, where c does not depend on n. We consider a single one of the equivalent cyclically shifted possibilities. The calculation requires handling $c=2$ and $c \geq 3$ separately, but the expression for $c \geq 3$ as a function of c holds for $c=2$ as well, so we omit the special case for brevity. The variance calculation depends on distance $\Delta = |i-j|$ up to $\Delta = c+1$, and for $c \geq 3$ this evaluates to:

$$\text{Var}[\hat{\tau}(Z)] = \frac{\bar{Y}^2}{n^2}\left[\left(n + \frac{4n}{c}\right) + \underbrace{\frac{2n}{c}(c+2)}_{\Delta=1} + \underbrace{\frac{2n}{c}\sum_{k=2}^{c-2}(c-k+2)}_{1<\Delta<c-1} + \underbrace{\frac{2n}{c}3}_{\Delta=c-1} + \underbrace{\frac{2n}{c}2}_{\Delta=c} + \underbrace{\frac{2n}{c}}_{\Delta=c+1}\right] + O\left(\frac{1}{n^2}\right).$$

This reduces to $$\text{Var}(\hat{\tau}(Z)) = \left(\frac{c}{2} + 2 + \frac{4}{c}\right)\bar{Y}^2 \frac{1}{n} + O(1/n^2),$$

which holds for all $c \geq 2$.

Figure 5:
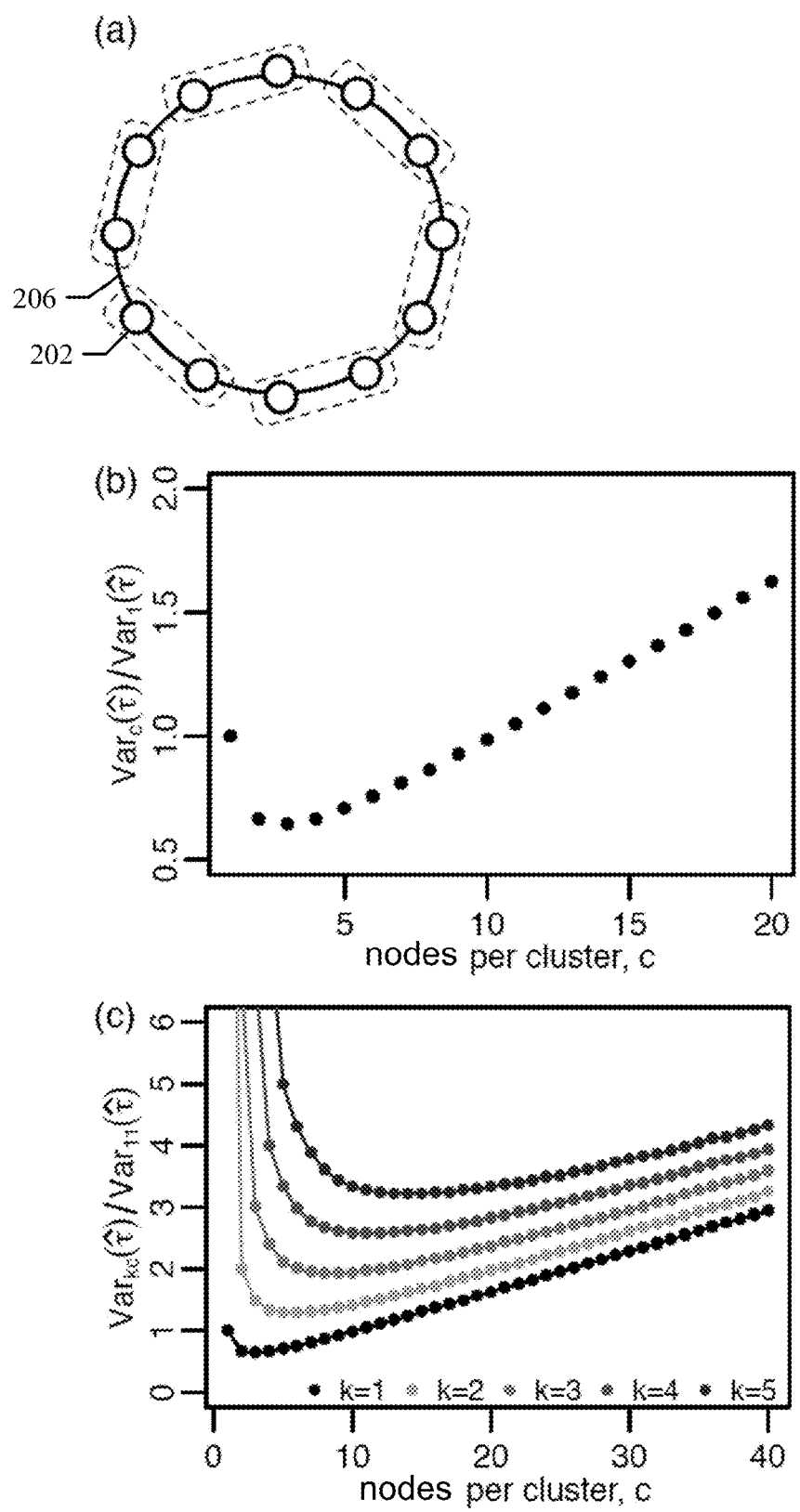
FIG. 5 illustrates an example cycle graph and variance calculation plots.

FIG. 5 illustrates an example cycle graph and variance calculation plots. Combining the calculations described above, the asymptotic variance of the estimator for all c is plotted in FIG. 5. The variance is minimized when randomizing clusters of size $c=3$, which corresponds exactly to the size of neighborhoods on the simple cycle. The cycle graph, (a) where nodes respond $\bar{Y}$ to treatment and 0 to control, shown clustered in groups of $c=2$ nodes. (b) Asymptotic variance of the estimator for this graph as a function of the number of nodes per cluster, normalized by estimator variance for $c=1$ nodes per cluster. (c) Simulated variance of the estimator for kth powers of the cycle graph for $k=1, \ldots, 5$ as a function of the number of nodes per cluster. For each k the variance for cluster size $c=2k+1$ grows linearly in k. Although FIG. 5 illustrates and this disclosure describes particular graphs and variance calculations, this disclosure contemplates any suitable graphs and variance calculations.

To build upon this observation, we now examine the simulated variance for higher degree extensions of the cycle, the so-called kth power of the cycle, where analytic derivation is already unwieldy. Thus, we use a simulation of the cluster randomization procedure to examine how the variance of the effect size estimator depends on the cluster size for these higher degree graphs.

The kth power of a cycle graph consists of a cycle where each node is connected to the k nearest neighbors on each side, yielding a regular graph where all nodes have degree $d=2k$. By sampling one million cluster randomizations on graphs with $n=5000$ nodes, we may compute the sample variance of the estimator across these samples. The results are shown in FIG. 5, for $k=1$ through $k=5$. The simulations for $k=1$ agree precisely with the overlaid asymptotic calculations.

The optimal cluster size c appears to scale approximately linearly in degree, and the variance at the optimal clustering size, the minimum value of each curve as k increases, appears to scale linearly in k. While the exact variance as a function of cluster size c is unwieldy to derive, we are able to provide the following upper bound, showing how the variance of the estimator for clusters of size $c=d+1$ scales linearly in the degree d of the graph. This suggests that one should treat contiguous blocks of the cycle attuned to the size of the neighborhood of the nodes.

When deriving this upper bound, it is no longer necessary to assume a uniform response $Y_i(\sigma_i^1) = \bar{Y}$ and instead we simply assume that the responses are upper bounded by some value $Y_i(\sigma_i^1) \leq Y_M$.

When clusters have size $c=d+1$, each node may be connected to at most 2 clusters, meaning that $1/\pi_i \leq 1/p^2$ for all i. So $$\text{Var}[\hat{\tau}(Z)] \leq \frac{Y_M^2}{n^2}\left[\sum_{i=1}^n (p^{-2} - 1) + \sum_{i=1}^n \sum_{\substack{j=1 \\ j \neq i}}^n \left(\frac{\pi_{ij}}{\pi_i \pi_j} - 1\right)\right].$$

Now each node has a non-independent joint assignment probability (such that $\pi_{ij} \neq \pi_i \pi_j$) with at most $3d+1$ other nodes: up to $2d+1$ other nodes when they are adjacent to two clusters, the d/2 to the left of the left cluster, and the d/2 to the right of the right cluster. The joint assignment probability $\pi_{ij}$ is at most $p^2$, since two nodes may not both be at the center of a cluster. For each i, the sum indexed by j then may be bounded, producing:

$$\text{Var}[\hat{\tau}(Z)] \leq Y_m^2 (p^2 - 1)(3d + 2)\frac{1}{n}.$$

This result tells us that it is possible to experimentally measure network effects on a cycle graph of very high degree d with a variance that is only linear in d, provided that the nodes are clustered in contiguous blocks of $d+1$ nodes. We now show how this strategy of bounding the variance applies to a much more general class of graphs, using a clustering algorithm that does not require knowledge of any geometric structure.

Clustering Restricted-Growth Graphs

We now begin developing the main result of this section, a cluster randomization scheme for the class of restricted-growth graphs. The first component is a clustering algorithm for such graphs in which each node is connected to at most a constant number of clusters, independent of the degree of the node. This will then imply that the variance on any restricted-growth graph may be upper bounded by a function linear in the degree. Our clustering shows that the nice decomposition of the cycle by contiguous regions may be generalized to arbitrary graphs in our class. In other words, the geometry isn't crucial; the restricted-growth property is enough.

Consider a restricted-growth graph $G=(V,E)$; we will present the case in which G is d-regular, but as we note below, the regularity may be relaxed to arbitrary degree distributions at the cost of a weaker but still constant bound on the number of connected clusters.

Recall that the restricted-growth condition says there exists $\kappa$ so that for all $v$ and all $r>0$, we have $|B_{r+1}(v)| \leq \kappa |B_r(v)|$.

Importantly, τ=0 is different: $B_o(v)$ is the singleton set $\{v\}$, while $B_1(v)$ is the neighborhood of v and hence has size d+1. Thus $|B_1(v)|/|B_0(v)|$=d+1, potentially much larger than the bound of κ on the ratio $|B_{r+1}(v)|/|B_r(v)|$ for τ>0. This is the crux of the restricted-growth condition: from radius 0 to 1 we have unrestricted growth (a factor of d+1), but then the growth slows to factors of κ which may be bounded separately from d.

In the language of metric spaces, we will cluster the graph using a 3-net for the shortest-path metric of G [ref. 8]. Formally, in a metric space X, an τ-net $Y \subset X$ is a collection of points that are mutually at distance at least r from each other, but the union of all their τ-balls covers the space, $X \subseteq \cup_{y \in Y} B_r(y)$. Accordingly, we call our construction a 3-net clustering of the graph. To build a 3-net clustering, we will iteratively identify nodes $v_1, v_2, \ldots$, 'marking' nodes as we do this. Afterwards we will identify clusters $C_1, C_2, \ldots$ to go with these nodes. More explicitly, we perform the following procedure consisting of two principle stages:
  Initially all nodes are unmarked.
  While there are unmarked nodes, in step j find an arbitrary unmarked node v, selecting v to be node $v_j$ and marking all nodes in $B_2(v_j)$.
  Suppose k such nodes are defined, and let $S = \{v_1, v_2, \ldots, v_k\}$.
  For every node w of G, assign w to the closest node $v_1 \in S$, breaking ties consistently (e.g. in order of lowest index).
  For every $v_j$, let $C_j$ be the set of all nodes assigned to $v_j$.

The sets $C_1, \ldots, C_k$ are then our 3-net clustering. The key property of this clustering is the following result, which establishes that each node is connected to a number of clusters that may be bounded by a function of κ, independent of the degree. As an example and not by way of limitation, consider any 3-net clustering of a graph G=(V,E). For all $w \in V$, the neighborhood $B_1(w)$ has a non-empty intersection with at most $\kappa^3$ distinct clusters. We first claim that for all $v_1 \in S$, we have. Indeed, consider any node $w \neq v_j$ in $C_j$. We have $w \notin S$, since otherwise w would belong to the cluster identified with itself. Now, consider the iteration i in which w was marked; we have $w \in B_2(v_i)$. Since $w \in C_j$ and it is assigned to the closest node in S, it follows that $w \in B_2(v_j)$. Thus $C_j \subseteq B_2(v_j)$. Next, we claim that for all $v_i, v_j \in S$, the sets $B_1(v_i)$ and $B_1(v_j)$ are disjoint. Suppose by way of contradiction that $B_1(v_j) \neq \emptyset$ It would follow that $v_i, v_j \in S$ and vice versa. But then if we consider the node among $v_i$ and $v_j$, that was added to S first, the other of $v_i$ and $v_j$ would have been marked in that iteration, and hence it could not have been added to S as well. This contradiction establishes that $B_1(v_i)$ and $B_1(v_j)$ are disjoint. To complete the proof, suppose by way of contradiction that $B_1(w)$ has a non-empty intersection with more than $\kappa^3$ distinct clusters: for some t>κ, let $u_1, u_2, \ldots, u_t$ be distinct nodes in $B_1(w)$ and $v_{i_1}, \ldots, v_{i_t}$ be distinct nodes in S such that $u_h \in C_{i_h}$ for h=1, 2, ..., t. Since $C_{i_h} \subseteq B_2(v_{i_h})$, and $C_{i_h}$ contains a node adjacent to w (or contains w itself), we have $v_{i_h} \in B_3(w)$, and hence $B_1(v_{i_h}) \subseteq B_4(w)$. The neighborhoods $B_1(v_{i_1})$, $B_1(v_{i_2}), \ldots, B_1(v_{i_t})$ are all pairwise disjoint as argued above, and they are all contained in $B_4(w)$, which implies that $|B_4(w)| \geq t(d+1) > \kappa^3(d+1)$. But applying the bounded growth inequality $|B_{r+1}(w)| \leq \kappa |B_r(w)|$ three times we have $|B_4(w)| \leq \kappa^3(d+1)$, a contradiction. This establishes that $B_1(w)$ may have a non-empty intersection with at most $\kappa^3$ distinct clusters.

The above result is formulated for d-regular graphs. But in fact one may show a weaker bound depending only on κ, even for arbitrary restricted-growth graphs, without any requirement on the degrees. This weaker bound of $\kappa^6$ may be established by observing that any restricted-growth graph exhibits a "bounded gradient" on the node degrees, whereby nodes that are near each other in the graph must have similar degrees. Combining this fact with previous leads to the desired bound.

Variance Bounds

We now apply the above results to bound the variance of the effect estimator $\hat{\tau}$. In the following section, assume that all responses obey upper bounds and positive lower bounds, $Y_i^x \in [Y_m, Y_M]$ for both exposure to treatment and control, x=0, 1. The reason for the positive lower bounds is that without them the users could all be responding zero to all treatments, making the variance zero regardless of the treatment scheme. We also assume the randomization probability p is not degenerate, i.e. $p \in (0, 1)$. We present the results for d-regular graphs to keep expressions manageable, but analogous results may be derived for arbitrary degrees.

We first establish an exponential lower bound for the variance under node-level randomization, and then we show a contrasting linear upper bound for the variance under our 3-net cluster randomization scheme. As an example and not by way of limitation, assume the variance of the Horvitz-Thompson estimator under full neighborhood exposure for node randomization of a graph with n nodes is lower bounded by an exponential function in the degree d of the graph, $\text{Var}[\hat{\tau}(Z)] \geq 0(1/n)(p^{-(d+1)} + (1-p)^{-(d+1)} - 1)$. The joint assignment probabilities for two nodes having the same exposure is at least the product of their individual probabilities, $\pi_{ij}^{xx} \geq \pi_i^x \pi_j^x$ for x=0, 1. Thus the double sum in (eq. 4) is non-negative. Similarly, for opposing exposure conditions, we have $\pi_{ij}^{xy} \leq \pi_i^x \pi_j^y$ for x≠y, which makes (eq. 5) a non-negative contribution to (eq. 3). We focus our lower bound on the main term of (eq. 4). Inputting the probabilities $\pi_i^1 = p^{d+1}$ and $\pi_i^0 = (1-p)^{d+1}$ and lower bounding responses gives us the desired result:

$$\text{Var}[\hat{\tau}(Z)] \geq \frac{1}{n^2}\left[\sum_{i=1}^{n}\left(\frac{1}{\pi_i^1} - 1\right)(Y_i^1)^2 + \sum_{i=1}^{n}\left(\frac{1}{\pi_i^0} - 1\right)(Y_i^0)^2\right] \geq$$

$$\frac{Y_m^2}{n}(p^{-(d+1)} + (1-p)^{-(d+1)} - 2).$$

For graphs with arbitrary degree distributions, this bound becomes $\text{Var}[\hat{\tau}(Z)] \geq O(1/n)\Sigma_{i=1}^{n}(p^{-(d_i+1)} + (1-p)^{-(d_i+1)} - 2)$, which is exponential in the degree of each node, meaning that even a single high degree nodes may easily explode the variance.

We now turn to our linear upper bound for growth-restricted graphs when using our 3-net clustering. As an example and not by way of limitation, assume the variance of the Horvitz-Thompson estimator under full, q-fractional, or k-absolute neighborhood exposure for a 3-net cluster randomization of a restricted-growth graph is upper bounded by a function linear in the degree d of the graph. Recall that the variance of the estimator is given by: $\text{Var}(\hat{\tau}(Z)) = \text{Var}(\hat{Y}^1) + \text{Var}(\hat{Y}^0) - 2\text{Cov}(\hat{Y}^1, \hat{Y}^0)$. We begin by upper bounding the variance of $\hat{Y}^1(Z)$, and the upper bound for $\hat{Y}^0(Z)$ follows the same principle. We conclude by bounding the covariance term. Each node is connected to at most $\kappa^3$ clusters. Thus we have the lower bound $\pi_i^1 \geq p^{\kappa^3}$, for both full and fractional neighborhood exposure:

$$\text{Var}[\hat{Y}^1(Z)] \le \frac{Y_M^2}{n^2}\left[n\left(\frac{1}{p^{\wedge}\kappa^3} - 1\right) + \sum_{i=1}^{n}\sum_{\substack{j=1\\j\ne i}}^{n}\left(\frac{\pi_{ij}^1}{\pi_i^1\pi_j^1} - 1\right)\right].$$

For each node i, the inner of the two sums is only nonzero at those nodes j for which the assignments are dependent. If the assignments for i and j are dependent, then they must each have neighbors in the same cluster $C_h$ associated with a node $v_h$ in the set of cluster centers. Since we previously established that $C_h \subseteq B_2(v_h)$, it follows that i and j are each within distance 3 of $v_h$ and hence within distance 6 of each other. Thus, any j whose assignment is dependent on i's must lie within $B_6$ (i), and so by the restricted-growth condition, there may be at most $|B_6(i)| \le \kappa^5 |B_1(i)| = \kappa^5 (d+1)$ such nodes j. Thus the sum over such j has at most $\kappa^5$ (d+1) terms. Also, $\pi_{ij}^1 \le p$ applies, since the two nodes must depend on at least one cluster. We obtain:

$$\text{Var}[\hat{Y}^1(Z)] \le Y_M^2 [((p^{\wedge}\kappa^3) - 1) + \kappa^5(d+1)((p^{\wedge}(-2\kappa^3 - 1)) - 1)]\frac{1}{n}.$$

Now, consider the contribution of the covariance term to the variance, $-2\text{Cov}(\hat{Y}^1, \hat{Y}^0)$, a positive quantity. Starting from (eq. 5), we apply the upper bound for the responses $Y_i$ to obtain:

$$-2\text{Cov}[\hat{Y}^1(Z), \hat{Y}^0(Z)] \le -\frac{2Y_M^2}{n^2}\sum_{i=1}^{n}\sum_{\substack{j=1\\j\ne i}}^{n}\left(\frac{\pi_{ij}^1}{\pi_i^1\pi_j^1} - 1\right) + \frac{2Y_M^2}{n}.$$

As with the previous analogous expression, for each i the inner sum is non-zero for at most $k^5(d+1)$ other nodes j. For the remaining terms, the quantity $-(\pi_{ij}^{10}/(\pi_i^1\pi_j^0)-1)$ is trivially upper bounded by 1. Thus we obtain:

$$-2\text{Cov}[\hat{Y}^1(Z), \hat{Y}^0(Z)] \le \frac{2Y_M^2}{n}[\kappa^5(d+1)+1].$$

Combining the upper bounds, we obtain a total upper bound that is linear in degree, as desired.

The restricted-growth condition we used was derived for regular graphs, but as we noted earlier, for restricted-growth graphs with arbitrary degree distributions we may apply a weaker but still constant bound on the cluster dependencies to obtain a variance bound that is still linear in the degree.

Figure 6:
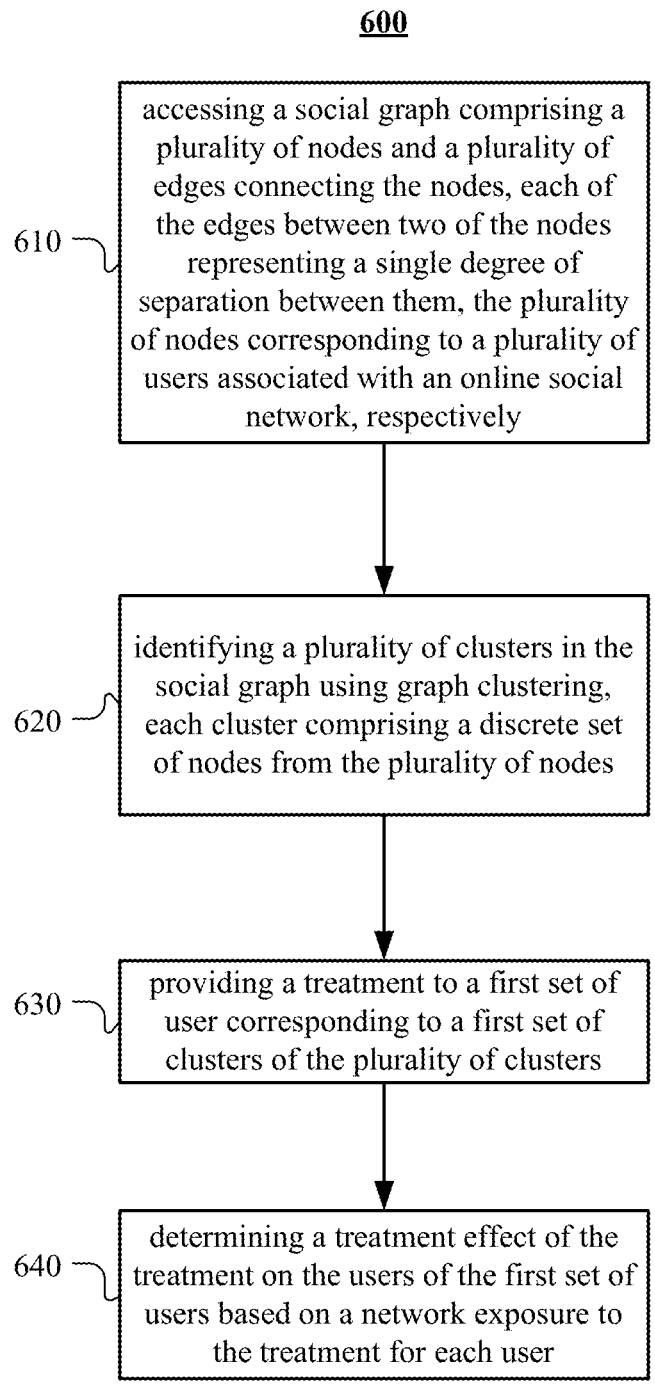
FIG. 6 illustrates an example method for determining treatment effects.

FIG. 6 illustrates an example method 600 for determining treatment effects. The method may begin at step 610, where social-networking system 160 may access a social graph 200 comprising a plurality of nodes and a plurality of edges connecting the nodes. Each of the edges between two of the nodes may represent a single degree of separation between them. The plurality of nodes may correspond to a plurality of users associated with an online social network, respectively. In particular embodiments, the plurality of nodes may correspond to a plurality of users or concepts associated with the online social network, respectively. At step 620, social-networking system 160 may identify a plurality of clusters in the social graph using graph clustering. Each cluster may comprise a discrete set of nodes from the plurality of nodes. A threshold number of nodes in each cluster may be network exposed with respect to the other nodes in the cluster. At step 630, social-networking system 160 may provide a treatment to a first set of user corresponding to a first set of clusters of the plurality of clusters. At step 640, social-networking system 160 may determine a treatment effect of the treatment on the users of the first set of users based on a network exposure to the treatment for each user. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining treatment effects including the particular steps of the method of FIG. 6, this disclosure contemplates any suitable method for determining treatment effects including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

REFERENCES

[ref. 1] E. Airoldi, E. Kao, P. Toulis, D. Rubin. Causal estimation of peer influence effects. In *ICML*, 2013.

[ref. 2] P. Aronow and C. Samii. Estimating average causal effects under general interference. *Working Paper*, May 27, 2013, available at http://arxiv.org/abs/1305.6156.

[ref. 3] L. Backstrom and J. Kleinberg. Network bucket testing. In *WWW*, 2011.

[ref. 4] B. Bollobás. *Random graphs*, Chapter 6. Cambridge Univ. Press, 2001 (2nd ed.).

[ref 5] D. Cellai, A. Lawlor, K. Dawson, J. Gleeson. Critical phenomena in heterogeneous k-core percolation. *Phys Rev E*, 87(2):022134, 2013.

[ref 6] S. Fienberg. A brief history of statistical models for network analysis and open challenges. *J. Comp. Graph. Stat.*, 2012.

[ref 7] S. Fortunato. Community detection in graphs. *Physics Reports*, 486(3):75-174, 2010.

[ref. 8] A. Gupta, R. Krauthgamer, J. Lee. Bounded geometries, fractals, and low-distortion embeddings. In *FOCS*, 2003.

[ref. 9] D. Horvitz, D. Thompson. A generalization of sampling without replacement from a finite universe. *JASA*, 1952

[ref 10] D. Karger, M. Ruhl. Finding nearest neighbors in growth-restricted metrics. In *STOC*, 2002.

[ref 11] L. Katzir, E. Liberty, O. Somekh. Framework and algorithms for network bucket testing. In *WWW*, 2012.

[ref 12] R. Kohavi, A. Deng, B. Frasca, R. Longbotham, T. Walker, Y. Xu. Trustworthy online controlled experiments: five puzzling outcomes explained. In *KDD*, 2012.

[ref. 13] C. Manski. Identification of treatment response with social interactions. The *Econometrics Journal*, 16(1):S1-S23, 2013.

[ref 14] D. Rubin. Estimating causal effects of treatments in randomized and nonrandomized studies. *J. Ed. Psych.*, 1974.

[ref. 15] E. Tchetgen, T. VanderWeele. On causal inference in the presence of interference. *Stat. Meth. Med. Res.*, 2012.

[ref. 16] J. Ugander, L. Backstrom. Balanced label propagation for partitioning massive graphs. In *WSDM,* 2013.

[ref 17] D. J. Watts and S. H. Strogatz. Collective dynamics of 'small-world' networks. *Nature,* 393(6684):440-442, 1998.

All references cite herein are incorporated by reference as if fully set forth.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/ or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content. In particular embodiments, one or more advertisements may be tested on one or more clusters of users of the online social network using network-aware product rollout techniques described previously.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Systems and Methods

Figure 7:
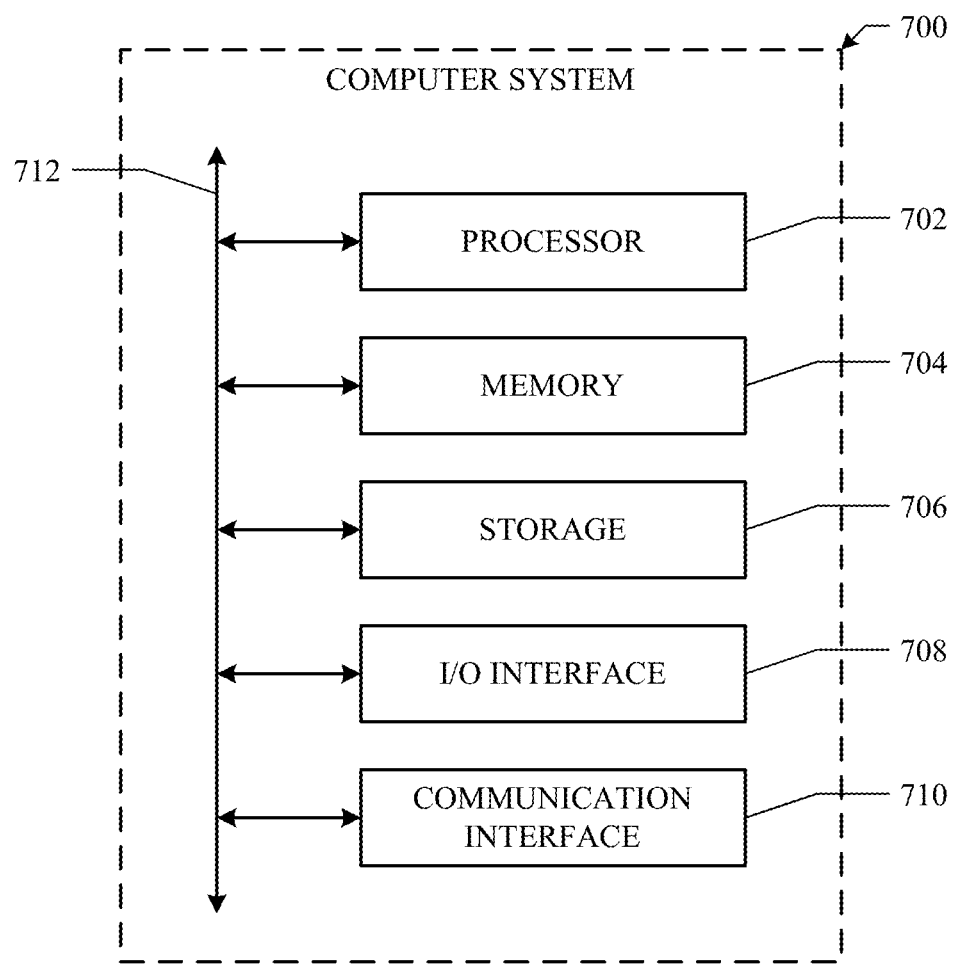
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more processors associated with one or more computing devices:
    accessing a social graph comprising a plurality of nodes and a plurality of edges connecting the nodes, each of the edges between two of the nodes representing a single degree of separation between them, the plurality of nodes corresponding to a plurality of users associated with an online social network, respectively;
    identifying a plurality of non-overlapping clusters in the social graph using graph clustering, each cluster comprising a discrete set of nodes from the plurality of nodes;
    providing a treatment to at least a first set of users and a second set of users, the first and second sets of users corresponding to a first set of clusters and a second set of clusters of the plurality of clusters, respectively, the first set of clusters being discrete from the second set of clusters; and
    determining, for each of at least the first and second sets of users, a treatment effect of the treatment on the users of the set of users based on a network exposure to the treatment for each user, wherein, for each respective cluster, the network exposure of the nodes in the cluster is absolute k-neighborhood exposure, absolute k-core exposure, fractional q-neighborhood exposure, or fractional q-core exposure.

2. The method of claim 1, wherein the treatment effect is a function of a network effect of the treatment for the users and an individual effect of the treatment for the users.

3. The method of claim 1, further comprising modifying the treatment based on the determined treatment effect of the treatment.

4. The method of claim 1, wherein, for each cluster, the network exposure of the nodes in the cluster has a specified distribution ranging from a threshold level of network exposure to a maximum level of network exposure.

5. The method of claim 4, wherein determining the treatment effect of the treatment comprises determining the treatment effect of the treatment for different levels of network exposure of the specified distribution range.

6. The method of claim 1, wherein, for each cluster, the network exposure of the nodes in the cluster is full neighborhood exposure or component exposure.

7. The method of claim 1, wherein, for each cluster, the social-graph affinity of the nodes in the cluster with respect to the other nodes in the cluster is greater than a threshold social-graph affinity.

8. The method of claim 1, wherein a node in a particular cluster is network exposed if a threshold fractions of nodes within one degree of separation of the node are in the same treatment condition.

9. The method of claim 1, wherein a threshold number of nodes is all nodes.

10. The method of claim 1, wherein providing the treatment comprises randomizing between treatment and control to the clusters of the plurality of clusters.

11. The method of claim 1, wherein the treatment is a particular advertisement.

12. The method of claim 1, wherein the treatment is a particular product or feature of a third-party system.

13. The method of claim 1, wherein the treatment is a particular product or feature of the online social network.

14. The method of claim 1, wherein identifying the plurality of clusters comprises identifying clusters such that a threshold number of nodes in each cluster is network exposed with respect to the other nodes in the cluster.

15. The method of claim 1, wherein the determined treatment effect of the treatment on the users in a particular cluster is an average treatment effect, $\tau$, wherein $$\tau(\vec{z}=\vec{1}, \vec{z}'=\vec{0}) = \frac{1}{n}\sum_{i=1}^{n}\left[Y_1(\vec{z}=\vec{1}) - Y_i(\vec{z}=\vec{0})\right],$$

and
wherein:
$\vec{z}=\vec{1}$ represents a user in the treatment group;
$\vec{z}'=\vec{0}$ represents a user in the control group;
n is a number of nodes in the particular cluster; and
$Y_i(\vec{z})$ is the potential outcome of user i under the treatment assignment vector $\vec{z}$.

16. The method of claim 1, further comprising:
determining an estimated average treatment effect between two randomized clusters, $\hat{\tau}$, wherein $$\hat{\tau}(Z) = \frac{1}{n}\sum_{i=1}^{n}\left(\frac{Y_i(Z)1[Z \in \sigma_0^i]}{Pr(Z \in \sigma_0^i)} - \frac{Y_i(Z)1[Z \in \sigma_1^i]}{Pr(Z \in \sigma_1^i)}\right),$$

and
wherein:
Z represents a random vector comprising the values of $\{0,1\}^n$;
n is a number of nodes in the particular cluster;
$\sigma_1^i$ represents an exposure condition of $\vec{z}=\vec{1}$, wherein $\vec{z}=\vec{1}$ represents a user in the treatment group;
$\sigma_0^i$ represents the exposure condition of $\vec{z}=\vec{0}$, wherein $\vec{z}'=\vec{0}$ represents a user in the control group;
$Y_i(\vec{z})$ is the potential outcome of user i under the treatment assignment vector Z.
$Pr(Z \in \sigma_1^i)$ is a probability of network exposure to the treatment;
$Pr(Z \in \sigma_0^i)$ is a probability of network exposure to the control; and
i represents the user associated with the node.

17. The method of claim 1, wherein for each identified cluster, a threshold number of nodes in each cluster is network exposed with respect to the other nodes in the cluster.

18. One or more computer-readable non-transitory storage media embodying software that is operable when executed to:
access a social graph comprising a plurality of nodes and a plurality of edges connecting the nodes, each of the edges between two of the nodes representing a single degree of separation between them, the plurality of nodes corresponding to a plurality of users associated with an online social network, respectively;
identify a plurality of non-overlapping clusters in the social graph using graph clustering, each cluster comprising a discrete set of nodes from the plurality of nodes;
provide a treatment to at least a first set of users and a second set of users, the first and second sets of users corresponding to a first set of clusters and a second set of clusters of the plurality of clusters, respectively, the first set of clusters being discrete from the second set of clusters; and
determine, for each of at least the first and second sets of users, a treatment effect of the treatment on the users of the set of users based on a network exposure to the treatment for each user, wherein, for each respective cluster, the network exposure of the nodes in the cluster is absolute k-neighborhood exposure, absolute k-core exposure, fractional q-neighborhood exposure, or fractional q-core exposure.

19. A system comprising: one or more processors; and a memory coupled to the processors comprising instructions executable by the processors, the processors operable when executing the instructions to:
access a social graph comprising a plurality of nodes and a plurality of edges connecting the nodes, each of the edges between two of the nodes representing a single degree of separation between them, the plurality of nodes corresponding to a plurality of users associated with an online social network, respectively;
identify a plurality of non-overlapping clusters in the social graph using graph clustering, each cluster comprising a discrete set of nodes from the plurality of nodes;
provide a treatment to at least a first set of users and a second set of users, the first and second sets of users corresponding to a first set of clusters and a second set of clusters of the plurality of clusters, respectively, the first set of clusters being discrete from the second set of clusters; and
determine, for each of at least the first and second sets of users, a treatment effect of the treatment on the users of the set of users based on a network exposure to the treatment for each user, wherein, for each respective cluster, the network exposure of the nodes in the cluster is absolute k-neighborhood exposure, absolute k-core exposure, fractional q-neighborhood exposure, or fractional q-core exposure.

* * * * *